Figure 1:
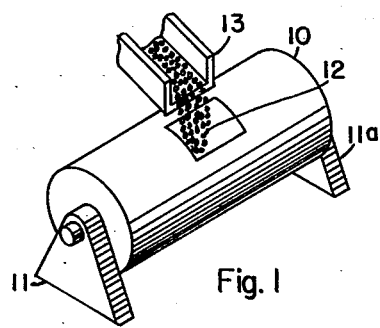

May 29, 1962     R. B. WADDELL, JR     3,036,340

METHOD OF MOLDING HIGH MOLECULAR WEIGHT POLYETHYLENE

Filed April 4, 1960     2 Sheets-Sheet 1

INVENTOR.
RUSSELL B. WADDELL, JR.
BY
Reuben Wolk
ATTORNEY

May 29, 1962 R. B. WADDELL, JR 3,036,340
METHOD OF MOLDING HIGH MOLECULAR WEIGHT POLYETHYLENE
Filed April 4, 1960 2 Sheets-Sheet 2

INVENTOR.
RUSSELL B. WADDELL, JR.
BY
ATTORNEY

United States Patent Office 3,036,340
Patented May 29, 1962

3,036,340
METHOD OF MOLDING HIGH MOLECULAR WEIGHT POLYETHYLENE
Russell B. Waddell, Jr., Torrance, Calif., assignor to The Dayton Rubber Company, Dayton, Ohio, a corporation of Ohio
Filed Apr. 4, 1960, Ser. No. 19,589
6 Claims. (Cl. 18—55)

The present invention relates to the molding of a plastic material by transfer or injection methods, particularly molding materials having a relatively high molecular weight, such as polyethylene.

In the art of injection or transfer molding it has been the customary practice to preheat the plastic material to be molded until it coalesces or achieves a continuous phase and becomes sufficiently flowable to be injected, extruded or expressed, as, for example, under the influence of a powered or pressurized piston or plunger, into the mold cavity. In the case of plastics such as polyethylene materials it has usually been considered desirable for optimum results that the actual mold cavity be relatively cool or at least below the temperature at which the plastic material softens and/or becomes flowable at the time the plastic enters this cavity. In fact, it is usually the practice to have the mold cavity chilled at the time the plastic material is introduced in order that disfiguring shrinkage will not take place as the plastic cools and becomes set in the mold cavity. More recently, however, it has been found that the finished products of certain plastic materials molded according to the above conditions will have the appearance of a satisfactory product, but upon actual use or test it is found that they are deficient in the important properties of flexibility, resilience, toughness and elongation; all factors affecting the fatigue resistance of the product. It has been assumed that these deficiencies have been caused by the rapid cooling of the plastic material as it goes from the injection pot into the chilled mold cavity.

The above-described deficiencies have now been found to be particularly acute in the case of high molecular weight polyethylene materials, and especially in polyethylene materials having a molecular weight of approximately 600,000 or greater. Furthermore, the acuteness of this problem in connection with the particular polyethylene material has only been discovered during development of the present invention. High molecular weight polyethylene material, when molded by injection into a heated or even a cooled mold, has responded favorably under conventional notched-izod impact tests and the like which, unforunately, have not been capable of demonstrating the poor physical properties of the material under fatigue. In view of the resulting unsatisfactory fatigue life of the polyethylene material which, for want of a known alternative reason, has been regarded as an inherent weakness in the material itself, such polyethylene has not been successfully molded in many commercial and industrial applications to which the material is in fact particularly well adapted. The usual method of processing the material has been machining of blocks thereof.

It is accordingly an object of the present invention to provide an improved method of molding a plastic material.

It is a further object of this invention to provide an improved method of preparing and molding by injection or transfer methods a high molecular weight thermoplastic material such as polyethylene.

It is yet another object of the present invention to provide such a method wherein the resultant product will be characterized by the optimum physical properties such as flexibility, resilience, toughness, elongation; all tending to improve fatigue resistance.

To achieve these and other objects and advantages which will be apparent from a reading of the following disclosure, the present invention comprises the improvements in conventional injection or transfer molding techniques, first, by way of preheating the mold cavity before the plastic is injected thereinto; second, by way of maintaining this heated condition of the mold cavity for a substantial time interval after the cavity is completely filled with the material; and, finally, by way of maintaining the high injection or transfer pressures upon the material during such time interval and while the material is being gradually cooled in the cavity. In the case of the high molecular weight polyethylene having a molecular weight of approximately 600,000 or greater, the present invention teaches the preheating of the mold cavity to a temperature of 260° F. to 350° F. and holding the material once injected under the injection pressure ranging from approximately 8,000 to 30,000 pounds per square inch or more for approximately five to twenty minutes before gradually cooling the mold and then releasing the high pressure. Within the limits specified, it has been generally found that the higher the pressure and temperature maintained upon the material while it is in the cavity, the shorter the time interval during which the plastic should be confined under pressure within the mold at the elevated temperature before cooling. Obviously, other variations in temperatures and pressures will depend on the specific materials to be used.

The invention thus generally described may be more clearly understood from the following detailed description of certain preferred embodiments thereof in connection with which reference may be had to the appended drawings.

Figure 2:
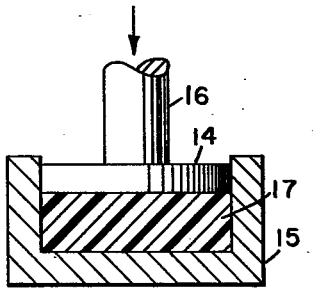
Figure 3:
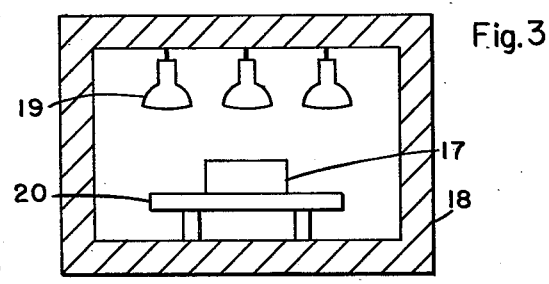
Figure 4:
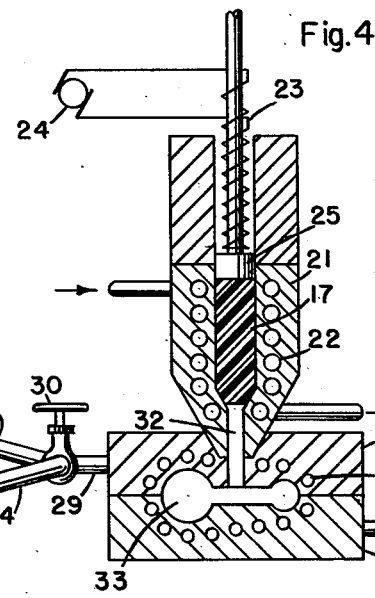
Figure 5:
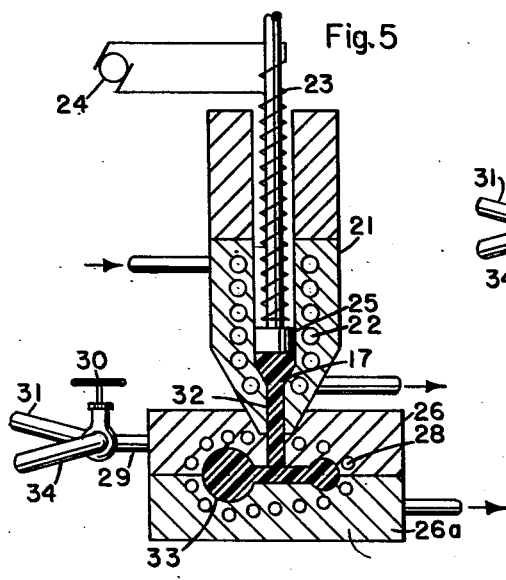
Figure 6:
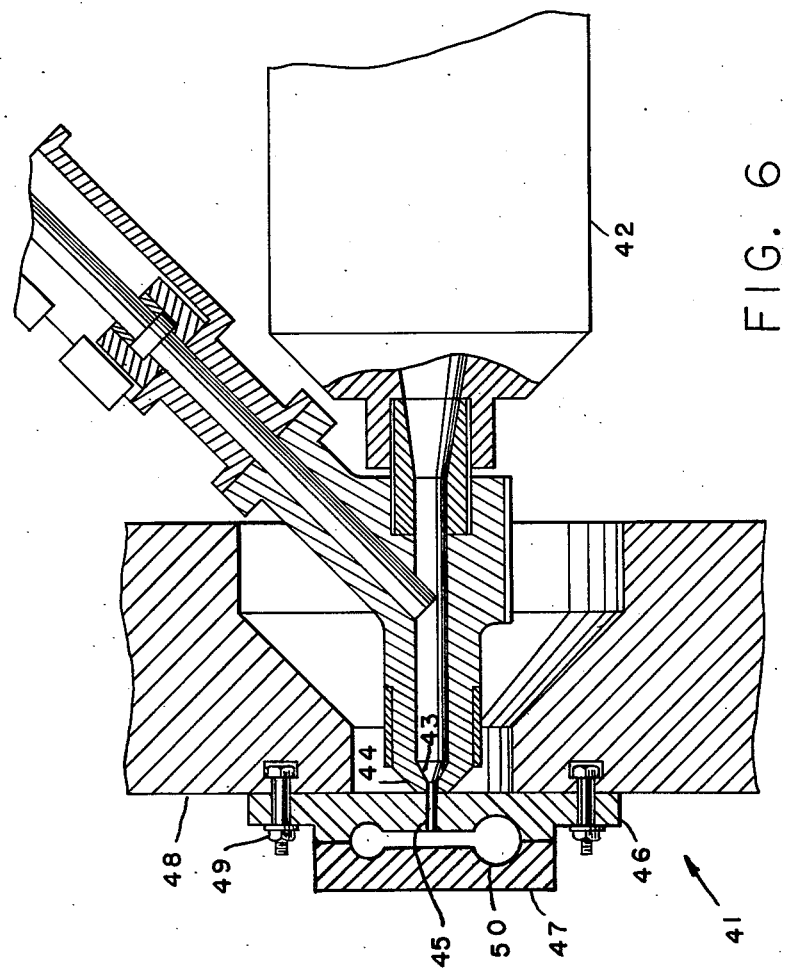

In the drawings:
FIGURE 1 is a perspective view of a conventional tumbler-type mixer in which the powdered or particulate ingredients to be molded according to the present invention are admixed.
FIGURE 2 is an elevational view in partial cross section showing a press or cold mold for making a pre-form of the powdered plastic material.
FIGURE 3 is an elevational view in partial cross section of a heating oven for conditioning the pre-form.
FIGURE 4 is an elevational view in partial cross section of an injection molding apparatus for use in the present invention at the early stages of the injection process.
FIGURE 5 is an elevational view in partial cross section of the apparatus illustrated in FIGURE 4 as it will appear at a later stage in the molding operation.
FIGURE 6 is an elevational view in partial cross section illustrating a typical injection molding device.

Referring now to FIGURE 1, a hollow cylindrical drum or container 10 is pivotally mounted upon the pedestals 11 and 11a to be rotatably driven by suitable means (not shown) to promote mixing in the manner of conventional mixing tumblers. A suitable opening 12 is provided in the drum 10 to receive the materials which are usually in powdered form. Such materials may be carried to and deposited in this opening by a conveyor trough or spout 13 which may be associated with scales or other metering device for achieving a proper proportion of ingredients.

Where it is desired to mold a specific product such as a drop box picker for weaving looms to be composed of a high molecular weight, low pressure, high density type polyethylene having a molecular weight of approximately 600,000 or greater, a lubricant such as calcium stearate should be added in the weight proportion of approximately 10 parts per 10,000 parts of the polyethylene powder, and a stabilizer such as dialkyl phenol sulfide should be employed in the weight proportion of from 15 to 20 parts per 10,000 parts of the polyethylene. These ingredients are then thoroughly mixed by the tumbler; and the mixture, measured in a predetermined quantity, is placed in the cavity 14 defined by the base 15 of the pre-form press shown in FIGURE 2. A piston 16, operating under high pressure within cavity 14, compresses and compacts the powdered material to the extent that the individual particles become relatively permanently adhered to form a unit which is known as the pre-form 17. The ultimate size of the pre-form is a function of the compacting characteristics of the powdered materials and the pressure to which the same are exposed, all of which are determined by the amount of material ultimately required in the finished product according to means well known to those skilled in the art of plastic molding. The pre-form thus completed may then be placed in an oven such as a hot air oven or the infrared oven 18 of FIGURE 3 having the infrared heating sources such as the lamps 19 therein and insulating walls defining a heating chamber. The pre-form may be placed upon a suitable support or pallet 20. In the case of the material here under consideration, the temperature within the oven 18 and the time during which the pre-form 17 is allowed to remain therein should be sufficient to bring the temperature of the pre-form slowly to approximately 360° F., thus acting as a "soak." This temperature will be sufficient to solidify the pre-form without polymerization thereof. If desired, the initial heating could take place in the injection pot to be hereinafter described, but the use of a separate oven shortens the time cycle from that which would be required if the unheated pre-form were placed directly in the molding apparatus.

The pre-form thus conditioned is then placed in the receptacle of the injection pot 21 of the apparatus shown in FIGURE 4. At the time the pre-form 17 is thus inserted in the injection pot, the latter, under the influence of a heating medium such as pressurized steam circulating within the helical passage 22 in the walls of the pot, is maintained at a temperature of 485° F. The pre-form 17 is first maintained at a relatively low pressure on the order of 200 pounds per square inch, which is below the pressure required for expression into the mold cavity. This relatively low pressure is held for approximately eight minutes, during which time the temperature of the injection pot is maintained at substantially 485° F. The pressure upon the pre-form is imparted by the ram 25 which is motivated by suitable pressure means such as a hydraulic system (not shown). The ram in this particular application is maintained throughout the entire molding process at elevated temperatures, in this particular instance at approximately 390° F. under the influence of the electrical heating coil 23 which is connected to a generator or a similar source of electrical energy schematically illustrated by the number 24. While the pre-form is held within the injection pot, the mold cavity members 26 and 26a are brought up to a temperature ranging from 260° F. to 350° F. by pressurized steam or other heating fluids within and passing through the labyrinth passages 28 contained within the walls of the mold members 26 and 26a and communicating by means of the passage 29 and the valve 30 with the conduit 31 which is the service or trunk line supplying the steam or heating fluid. The temperature thus established is at least 150 Fahrenheit degrees above the temperature previously employed in heating the mold cavity for the purpose of maintaining the plastic at a flowable state, to promote the flow of material and promote the formation of a homogeneous product that will develop the desirable properties. Such a product cannot be obtained at the lower temperatures previously employed.

After the pre-form has been held in the injection pot for the eight-minute period thereby achieving the 260° F. to 350° F. and becoming partially fused and devoid of air pockets and the like, the pressure acting upon the ram is increased to a minimum of 8,000 pounds per square inch, whereupon the ram moves downward and the fused material within the pot 21 is extruded or expressed through the sprue passage 32 into the cavity 33 defined by the mold members 26 and 26a and surrounded by the fluid passages 28 as shown in FIGURE 5. The heated condition of the mold members 26 and 26a and consequently the cavity 33 as shown in FIGURE 5 is then maintained for an even greater length of time, on the order of sixteen minutes, all while the high injection pressure is maintained under the influence of the pressurized and heated ram 25.

At the expiration of this time interval, the three-way valve 30 is manipulated to associate the channels 28 and 29 with the service or trunk line 34 which carries a circulating coolant such as water or the like, having a temperature of about 60° F. to 70° F., to slowly cool the cavity 33 over a two to eight-minute interval. Once the cooling is completed, the high pressure is released and the ram is withdrawn, whereupon the valve 30 is again changed to provide communication between the heating fluid within the channel 31 and the tubes 28 to begin the reheating of the mold cavity for the subsequent operation. After this reheating of the mold cavity has progressed for approximately one minute to release the molded product from the walls thereof, the mold members 26 and 26a are separated and the product removed. Thereupon the mold may be closed preparatory to receiving another charge or pre-form placed in the injection pot for a repetitive operation.

FIGURE 6 illustrates an injection molding apparatus with which the inventive process may be carried out. This apparatus is alternative to the transfer mold previously described but the same steps are involved. The apparatus is generally designated by reference numeral 41, and will be generally described as follows. Fuller details of such apparatus are set forth in U.S. Patent No. 2,862,241. The apparatus includes a heating cylinder 42 through which the plastic material may be fed. This material is the same as that previously described in connection with the transfer molding process, and consists of the ingredients mixed in the FIGURE 1 apparatus, preferably in the proportions previously discussed. The material is maintained at about 450° F. and injected at a pressure of about 8,000 pounds per square inch through bore 43 of nozzle 44 and into mold opening 45, leading to the two mold halves 46 and 47. The mold half 46 is secured to the head 48 of the apparatus by means of bolt assemblies 49. The mold halves are maintained at a temperature of 260° F. to 350° F. by conventional heating means (not shown) such as those illustrated in FIGURES 4 and 5. These halves define a mold cavity 50 in which the finished product is actually formed. The material is cured in the cavity while still under about 8,000 pounds per square inch pressure for a period of approximately four minutes, then allowed to remain in the cavity while the temperature is gradually reduced to 60° F. to 70° F. over a two to eight-minute interval (as in the principal modification).

The first observation of products made according to the above method, wherein the mold cavity is preheated to a temperature higher than those previously employed in the injection or transfer molding of such thermoplastic materials as high molecular weight polyethylene, and this temperature is maintained for a substantial interval of time while the material being molded is exposed to the high injection or extrusion pressures, shows that the product is substantially free from any of the above deficiencies described above. When such products are then subjected to life tests or are placed in actual use wherein their physical properties are tested beyond those normally encountered in preliminary laboratory tests, it has been found that such properties as the flexibility, elongation and fatigue resistance may be taxed repeatedly and for prolonged periods of time without substantial deterioration of the part. For example, actual factory installations were made of 300 pickers manufactured by the conventional molding process, and 500 pickers manufactured by the novel process. It was found that the pickers in the first group had a life of one to four weeks, while the pickers in the second group had a minimum life of fifty-two weeks.

While the present invention has been thus described in considerable detail in connection with certain preferred embodiments thereof, it is to be understood that the foregoing particularization and detail have been for the purpose of illustration only and modifications thereof are contemplated within the scope of the subjoined claims.

I claim:

1. A method for molding a high density, high molecular weight polyethylene powder comprising admixing a stabilizer with said powder, compressing the mixture into a pre-form, inserting said pre-form into an injection pot and heating to a temperature of 485° F., simultaneously heating a mold cavity to a temperature of at least 260° F., applying a pressure of at least 8,000 pounds per square inch upon the pre-form within the injection pot causing it to move into said mold cavity and maintaining said pressure and the temperature of said mold cavity for a period of approximately sixteen minutes after said cavity has been completely filled with said pre-form.

2. A method according to claim 1 wherein said polyethylene material has a molecular weight of 600,000 or greater.

3. A method according to claim 2 wherein said stabilizer is dialkyl phenol sulfide and is employed in the proportion by weight of from 15 to 20 parts of such crystals to 10,000 parts of the polyethylene.

4. A method for molding a high molecular weight polyethylene powder comprising admixing from 15 to 20 parts by weight of dialkyl phenol sulfide and 10 parts by weight of calcium stearate to 10,000 parts by weight of the polyethylene material, compressing this mixture into a pre-form, heating the pre-form to a temperature of 360° F., placing the heated pre-form in an injection pot having a temperature of 485° F., applying a relatively low pressure on the order of 200 pounds per square inch upon the pre-form within the injection pot and maintaining such pressure and the temperature of such pot for approximately eight minutes, preheating a mold cavity to a temperature of at least 260° F., applying a relatively high pressure on the order of 8,000 pounds per square inch to the pre-form within said injection pot and causing the pre-form to flow into the heated mold cavity and maintaining the temperature of said mold cavity to at least 260° F. and said pressure of 8,000 pounds per square inch for sixteen minutes and thereafter gradually cooling said mold cavity to a temperature below the flow temperature of said pre-form.

5. A method according to claim 4 wherein the gradual cooling of said mold takes place over a period of two to eight minutes.

6. In a method of molding high molecular weight polyethylene by heating the polyethylene to an at least partially flowable state and forcing it into a cavity within a mold member, the improvement comprising the steps of heating the mold member to a temperature of at least 260° F., subsequently forcing said polyethylene into said cavity under a pressure of approximately 8,000 pounds per square inch, and thereafter maintaining said temperature and said pressure for a period of approximately four minutes.

References Cited in the file of this patent

UNITED STATES PATENTS

| | | |
|---|---|---|
| 2,338,607 | Wacker | Jan. 4, 1954 |
| 2,781,547 | Moxness | Feb. 19, 1957 |
| 2,834,992 | Jupa | May 20, 1958 |